UNITED STATES PATENT OFFICE.

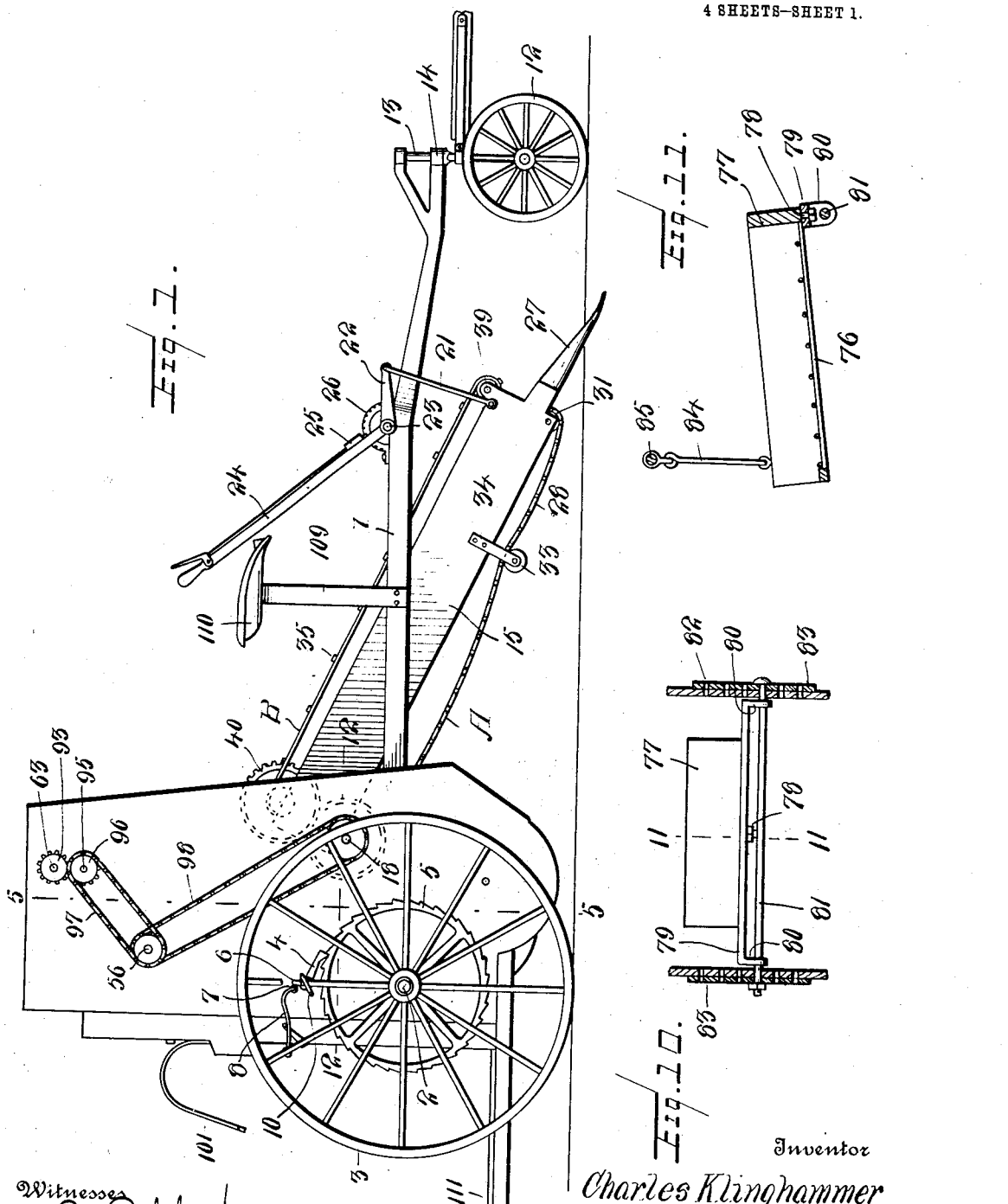

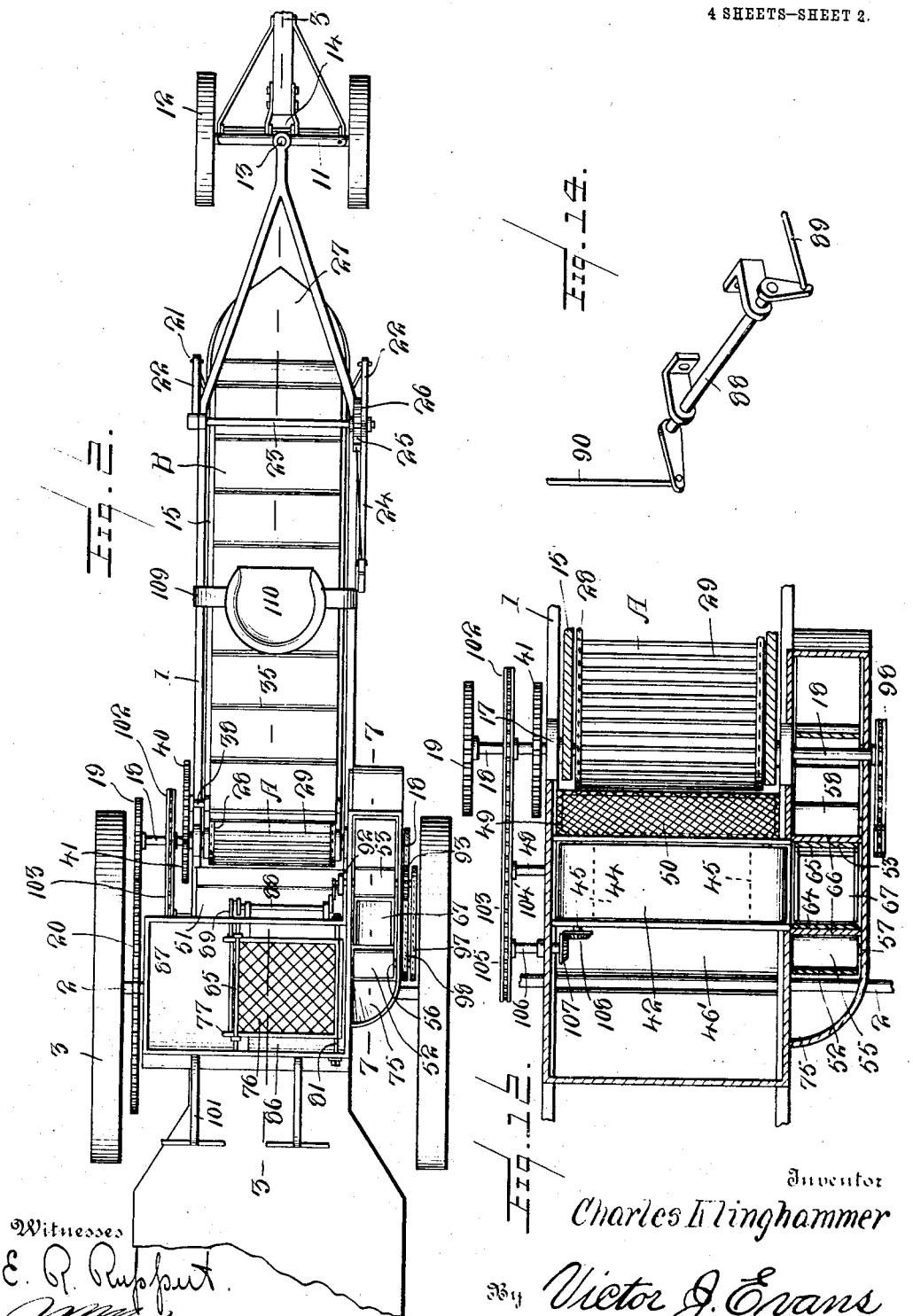

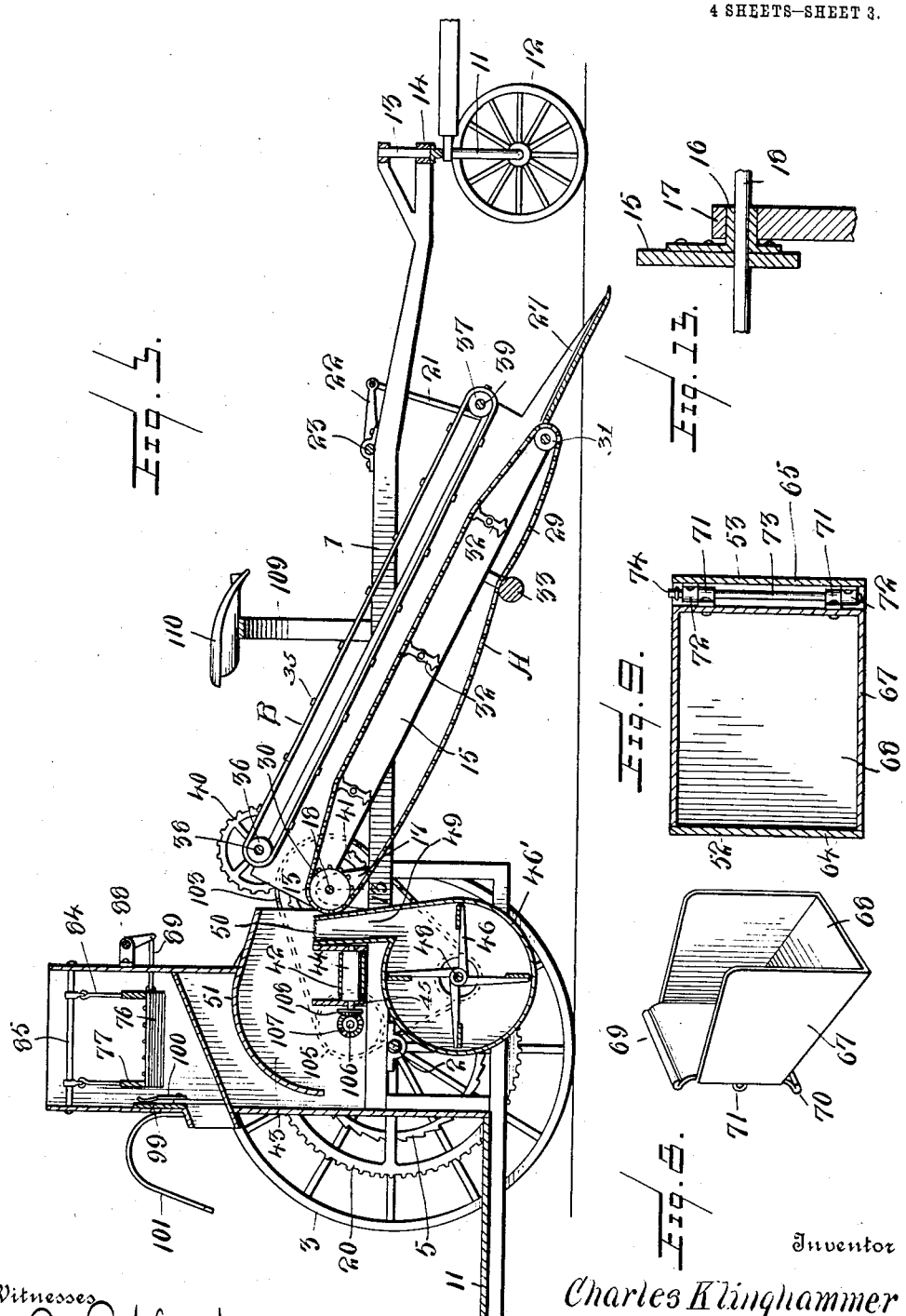

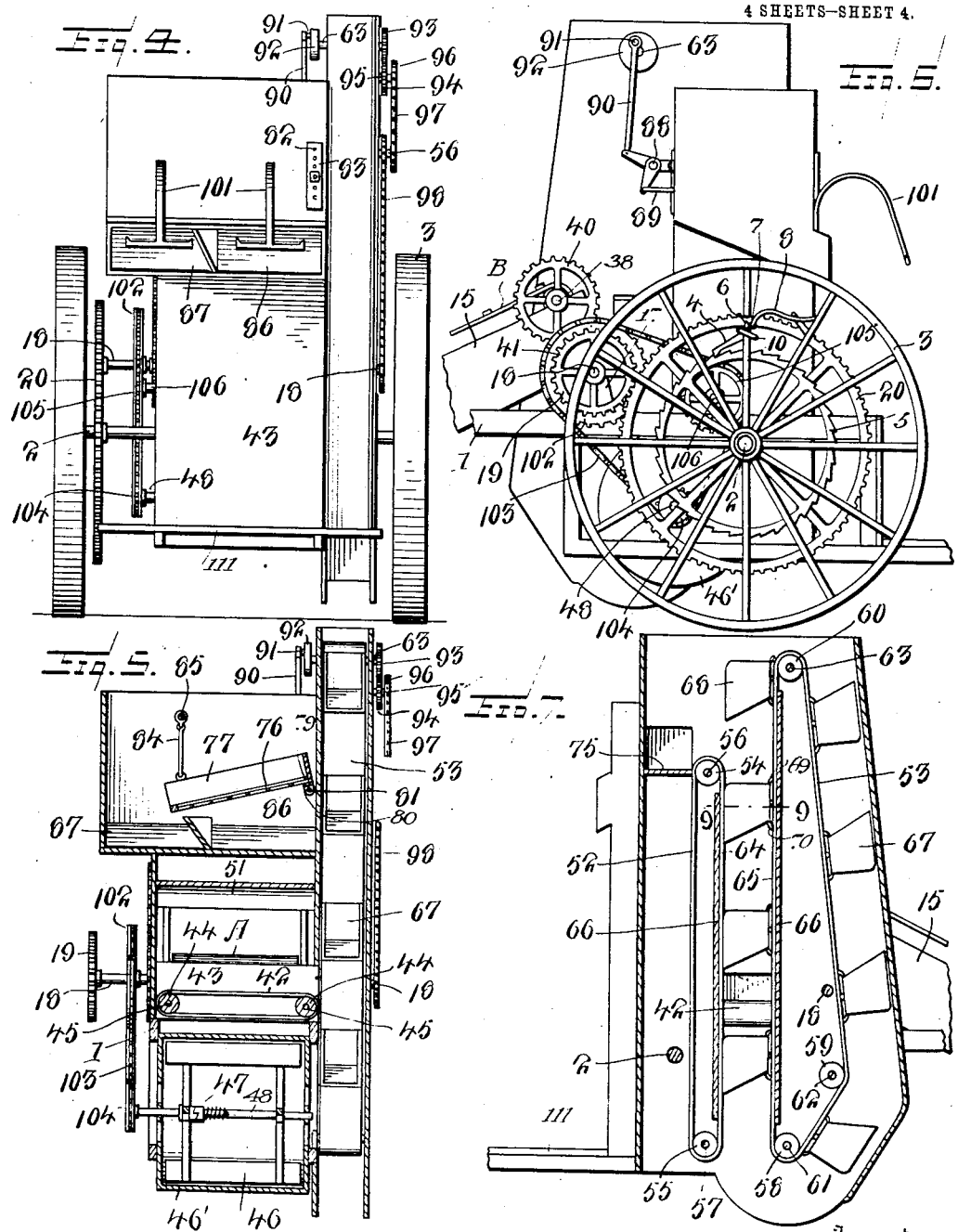

CHARLES KLINGHAMMER, OF LA GRANDE, OREGON.

POTATO-HARVESTER.

1,107,965.

Specification of Letters Patent.

Patented Aug. 18, 1914.

Application filed November 13, 1912. Serial No. 731,122.

*To all whom it may concern:*

Be it known that I, CHARLES KLINGHAMMER, a citizen of the United States, residing at La Grande, in the county of Union and State of Oregon, have invented new and useful Improvements in Potato-Harvesters, of which the following is a specification.

This invention relates to potato harvesters, and it has for its object to produce a wheel supported machine of simple and efficient construction whereby potatoes may be dug from the ground, conveyed to a location between the supporting wheels of the machine and there separated from the dirt and vines, the potatoes being disposed of by a lateral conveyer wheel. The dirt and vines are deflected above the lateral conveyer and dropped on the ground into the furrow from which the potatoes were excavated, the vines being thus left in the wake of the machine in such manner that they cannot become entangled with moving parts of the machine.

A further object of the invention is to separate the vines and dirt from the potatoes by a blast of air directed upwardly instead of in an approximately horizontal direction, as has heretofore been done, thereby effecting a more thorough separation.

A further object of the invention is to provide a construction whereby the potatoes and vines will be crowded over a screen through which a blast is directed upwardly, the heavy portions, that is to say, the potatoes being permitted to gravitate on to a conveyer, while light portions, that is to say, the dirt and vines, being thrown upwardly against a deflector, whereby said dirt and vines will be guided clear of the conveyer and dumped into the furrow from which the potatoes have been extracted.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a machine constructed in accordance with the invention. Fig. 2 is a top plan view of the same. Fig. 3 is a longitudinal vertical sectional view taken on the line 3—3 in Fig. 2. Fig. 4 is a rear elevation. Fig. 5 is a transverse sectional view taken on the line 5—5 in Fig. 1. Fig. 6 is a side elevation of the rear part of the machine as seen from the opposite side to that shown in Fig. 1. Fig. 7 is a vertical sectional detail view taken on the line 7—7 in Fig. 2. Fig. 8 is a perspective detail view of one of the elevator buckets. Fig. 9 is a horizontal sectional view taken through one of the elevator buckets and the carrying belts to show the manner of mounting the bucket on the belt taken on the line 9—9 in Fig. 7. Fig. 10 is a sectional detail view, enlarged, showing the construction and arrangement of the grading screen. Fig. 11 is a sectional detail view taken on the line 11—11 in Fig. 10. Fig. 12 is a horizontal sectional detail view taken on the line 12—12 in Fig. 1. Fig. 13 is a sectional detail view taken on the line 13—13 in Fig. 3. Fig. 14 is a detail view of the means whereby motion is transmitted to the grading screen.

Corresponding parts in the several figures are denoted by like characters of reference.

The main frame 1 of the improved machine is supported near its rear end on an axle 2 having ground wheels 3, 3 which are loose on the axle, one or each of said ground wheels being provided with a dog or pawl 4 engaging a ratchet clutch 5 which is fixed on the axle. Each dog 4 is provided with an outwardly extending lug forming a heel 6 which is engaged by a roller 7 carried by a spring 8 which is mounted on the ground wheel. The dog 4 is provided with a thumb lever or handle 10 whereby it may be partly turned so as to place the dog into or out of engagement with the ratchet wheel, the dog being retained in adjusted position by the action of the spring supported roller engaging one or the other side of the lug or heel 6. By this simple means the axle may be caused to rotate or to remain stationary when the machine is in operation, thus throwing the moving parts, which are driven from the axle, into or out of gear.

The forward end of the machine is supported on an arched axle 11 having ground wheels 12 and provided with an upwardly extending arm 13 constituting a king bolt which is supported for rotation in a bearing 14 carried by the frame. A tongue or other draft means may be connected in the usual manner with the front axle, and it is obvious that the front truck, arranged as shown and described, will enable the machine to be easily guided and turned.

The frame of the machine supports a forwardly and downwardly inclined conveyer trough or casing 15, the sides of said casing being provided at their rear ends with trunnions 16 which are supported in bearings 17, said trunnions being bored for the passage of a shaft 18 carrying a spur wheel 19 meshing with a spur wheel 20 mounted on the rear axle from which motion will thus be transmitted to the shaft 18. The forward end of the conveyer casing is connected by means of links 21 with arms 22 extending from a rock shaft 23 which is supported for oscillation on the frame 1, said rock shaft being provided with a lever handle 24 having a stop member 25 adapted to engage a quadrant 26, whereby the lever and the parts controlled thereby may be retained in adjusted position. It will be readily seen that by manipulating the lever 24, the forward end of the conveyer casing may be raised or lowered, thus placing the share or digger 27 carried at the lower end of the casing out of or into engagement with the ground for the purpose of digging the potatoes. It will be seen that the share constitutes an inclined plane over which the potatoes and the dirt adhering thereto will be guided upwardly into the casing where they are delivered on to the endless conveyer A which is composed of chains 28 that are connected at intervals by rods 29, said chains being guided over sprocket wheels 30 on the shaft 18 and also over pulleys or guide wheels 31 that are supported for rotation adjacent to the lower forward end of the conveyer casing. The upper lead of the conveyer is also guided over suitable shakers 32 mounted at intervals in the conveyer casing; the lower lead of the conveyer chain is guided over a roller 33 mounted in brackets 34 depending from the conveyer casing, whereby the said lower lead of the conveyer is kept clear of the ground. The conveyer trough or casing 15 also supports an endless draper B consisting of a canvas or other flexible apron equipped with transverse slats 35. The draper B is guided over rollers 36, 37 on shafts 38, 39 located, respectively, adjacent to the upper, rear and the lower, front ends of the conveyer casing, said shafts being supported for rotation in bearings adjacent to the upper edges of the side members of said casing. The shaft 38 has a pinion or spur wheel 40 meshing with a similar spur wheel 41 on the shaft 18, from which motion in the proper direction will thus be imparted to the draper B.

From the endless conveyer A the vines with the potatoes and such dirt as may still adhere after the passage over the conveyer are discharged on to an endless apron or carrier 42 which is located in the bottom of a chamber or compartment 43 in rear of the conveyer casing, said apron being guided over rollers 44 on shafts 45, said conveyer being driven by means to be hereinafter described. A fan 46 contained in a casing 46' is driven by means to be hereinafter described. Said driving means includes a clutch 47 on the fan shaft 48, whereby said shaft may continue to rotate if the machine should be stopped suddenly until stopped by friction, thereby avoiding injury to the fan by sudden stoppage. The fan casing 46' is suitably supported below the endless conveyer 42, and the discharge spout 49 of the fan casing is guided between the conveyer 42 and the discharge end of the conveyer A, said spout being protected by a screen 50. The blast delivered through the fan spout is discharged against the underside of an arcuate deflector 51 which is supported a suitable distance above the conveyer 42. Said deflector extends from a point slightly in advance of the discharge spout 49 to a point well in rear of the conveyer 42, the space in rear of said conveyer being open and unobstructed so that the dirt and vines that are forcibly thrown upward against the underside of the deflector will be guided by the latter clear of the conveyer 42 and be discharged in rear of the latter on to the ground and directly in the furrow from which the potatoes have been excavated; that is to say, between the supporting wheels of the machine and clear of any moving parts of the machine so that the progress of the latter will not be obstructed or hindered in any way. It will also be seen that in the separating process, the potatoes and vines coming from the conveyer A will be crowded over the screen 50 which obstructs the opening of the fan spout 49, said screen occupying a substantially horizontal position. The blast coming through the spout 49 will obviously dispose of the vines and dirt in an upward direction, while the potatoes will be crowded over the screen and fall on to the conveyer 42. By this construction there will be practically no possibility of potatoes being lost even when a very powerful blast is used.

Supported on the frame adjacent to one side of the compartment 43, and suitably communicating with said compartment is an elevator comprising two endless belts 52, 53, the former being guided over rollers 54, 55 on shafts 56, 57, while the belt 53 is guided over rollers 58, 59, 60 supported on shafts 61, 62, 63. The elevator belts 52, 53 have opposed parallel leads 64, 65 which are disposed in approximately vertical planes, and said opposed leads are guided over suitably supported braces 66, whereby they are maintained in taut condition and prevented from yielding or flexing unduly. Supported on the forward belt are a plurality of buckets 67, made of sheet metal such as zinc or galvanized iron, said buckets being open at the top and at the rear, the rear openings of the upgoing buckets being, however, obstructed by the vertical lead 64 of the belt 52. Each bucket is also provided with a sloping bottom 68 and with bearing flanges 69, 70 at its upper and lower edges to engage the face of the belt 53 with which it is connected. Each bucket is also provided about midway between the bearing flanges with lugs or keepers 71 corresponding with similar lugs or keepers 72 on the belt 53 for the reception of a connecting rod 73, whereby the bucket may be detachably mounted on the belt, said connecting rod being provided with a cotter pin 74 to retain it securely in position against accidental displacement.

It will be seen that when the machine is in operation and the elevator belts are driven in the proper direction, the buckets will ascend between the belts, the open ends of the respective buckets being closed or obstructed by the upgoing lead 64 of the belt 52. The buckets, as they ascend, receive the potatoes discharged over the conveyer 42, and as the buckets pass above the roller 54 which supports the upper portion of the belt 52, the contents will be discharged upon a curved or arcuate spout or chute 75 that discharges on to the grading screen 76.

The grading screen is supported detachably on a frame or casing 77, thus enabling a screen of a different mesh to be substituted whenever desired. The frame 77 is connected by a pivot 78 with a cleat 79 having apertured ears or lugs 80, whereby it is mounted on a supporting rod 81 which is vertically adjustable in apertures 82 formed in a pair of cleats or supporting members 83. The free end of the frame 77 is supported by means of links 84 by a cross bar 85. The grading screen is supported directly above one of two hoppers or compartments 86, 87, the other of which receives the large potatoes which are discharged over the screen. It is obvious that by using a plurality of grading screens, more than two grades of potatoes may be obtained, and it is also evident that by removing the screen, the grading or sorting of the potatoes will be omitted.

For the purpose of imparting vibratory motion to the grading screen, a bell crank 88 is provided, one arm of said crank being connected with the screen frame 77 by a link 89, while a pitman 90 connects the other arm of the bell crank with a wrist pin 91 on a disk 92 which is mounted on the shaft 63 carrying the roller 60 over which the upper portion of the elevator belt 53 is guided. The shaft 63 has a pinion 93 meshing with a pinion 94 on a stub shaft 95, said pinion being associated with a sprocket wheel 96 which is driven by a chain 97 from the shaft 56 over which the elevator belt 52 is guided, said shaft 56 being in turn driven by a chain 98 on the shaft 18, which latter is driven directly from the axle, as hereinbefore described. The hoppers 86 and 87 are each provided with a movable obstructing slide 99 which may be supported in a non-obstructing position by means of a spring 100. Each hopper is also provided with a suitable bag holding device 101 for the purpose of supporting bags while being filled; while such bags are being tied and replaced, the discharge from the hoppers may be obstructed by the slides 99, as will be readily understood.

The shaft 18, which is driven directly from the rear axle of the machine is provided with a sprocket wheel 102 from which a chain 103 is guided over a sprocket 104 on the fan shaft 48 which will thus be driven. The chain 103 is also guided over a sprocket 105 on a shaft 106 carrying a bevel gear 107 meshing with a bevel gear 108 on one of the shafts 45, thus actuating the endless conveyer 42, whereby the potatoes are discharged into the elevator buckets.

The frame of the machine supports an arc 109 on which a seat 110 for the driver is mounted. The rear portion of the frame structure also supports a platform 111 on which an operator may be stationed for the purpose of attending to the tying and replacing of the bags that are to be filled when the machine is in operation.

As will be seen from the foregoing description taken in connection with the drawings hereto annexed, when the machine is drawn over the field and the front end of the conveyer casing 15 is lowered, potatoes, earth and vines will be caused to move over the inclined plane presented by the share 27 on to the endless conveyer A, whereby said materials will be moved upwardly and rearwardly, being meanwhile subjected to agitation by the shakers 32. The loose dirt will thus be separated from the potatoes and vines which will be discharged over the upper rear end of the conveyer, the vines being separated from the potatoes by the blast from the fan and deposited on the ground in rear of the conveyer 42 by the deflector 51. The potatoes which drop on the conveyer 42 will be carried by the latter to the ascending elevator buckets, from which they will be deposited on the chute 75 over which they are conveyed to the grading screen, being thereby graded and discharged into the hoppers 86, 87 and from said hoppers to the bags or receptacles provided to receive them. Potatoes may thus be dug, cleaned and graded or sorted at a single operation and in a very rapid and effective manner, the machine being simple in construction and light of draft.

Having thus described the invention, what is claimed as new, is:—

1. In a potato harvester, a wheel supported frame, a longitudinal conveyer carried thereby, and a digger associated with said conveyer, means for driving the conveyer, and means for discharging a blast of air in an upward direction against material discharged over the rear end of the conveyer.

2. In a potato harvester, a wheel supported frame, a longitudinal conveyer carried thereby, digging means associated with the conveyer at the forward end thereof, a fan casing having an upwardly extending spout positioned adjacent to the discharge end of the conveyer, and a driven fan in the casing serving to discharge a current of air upwardly against material discharged over the rear end of the conveyer.

3. In a potato harvester, a wheel supported frame, a longitudinal conveyer carried thereby, digging means associated with the conveyer at the forward end thereof, a fan casing having an upwardly extending spout positioned adjacent to the discharge end of the conveyer, a driven fan in the casing serving to discharge a current of air upwardly against material discharged over the rear end of the conveyer, and a screen obstructing the fan spout.

4. In a potato harvester, a wheel supported frame, a longitudinal conveyer carried thereby, digging means associated therewith, a fan casing supported in rear of the conveyer and having an upwardly extending spout provided with a screen over which material discharged over the conveyer is crowded, a driven fan in the casing, and an arcuate deflector supported above the fan spout to receive relatively light material affected by the air blast coming through the spout and to deflect the same downwardly between the wheels of the machine into the furrow from which the potatoes are excavated.

5. In a potato harvester, a wheel supported frame, a longitudinal conveyer carried thereby and having digging means associated therewith, a fan casing supported in rear of the conveyer and having an upwardly extending spout terminating adjacent to the discharge end of the conveyer, a laterally driven conveyer positioned adjacent to the rear side of the spout, a driven fan in the fan casing, and an arcuate deflector positioned above the discharge spout of the fan casing to intercept light material and to discharge such light material downwardly in rear of the lateral conveyer.

6. In a potato harvester, a wheel supported frame, a longitudinal conveyer carried thereby and having digging means associated therewith, a fan casing supported in rear of the conveyer and having an upwardly extending spout terminating adjacent to the discharge end of the conveyer, a laterally driven conveyer positioned adjacent to the rear side of the spout, a driven fan in the fan casing, and an arcuate deflector positioned above the discharge spout of the fan casing to intercept light material and to discharge such light material downwardly in rear of the lateral conveyer; in combination with a screen obstructing the discharge spout of the fan casing.

7. In a potato harvester, a wheel supported frame, a longitudinal conveyer carried thereby and having digging means associated therewith, a fan casing supported in rear of the conveyer and having an upwardly extending spout terminating adjacent to the discharge end of the conveyer, a laterally driven conveyer positioned adjacent to the rear side of the spout, a driven fan in the fan casing, and an arcuate deflector positioned above the discharge spout of the fan casing to intercept light material and to discharge such light material downwardly in rear of the lateral conveyer; in combination with a screen obstructing the discharge spout of the fan casing, and an elevator to receive the relatively heavy material discharged on to and over the lateral conveyer.

In testimony whereof I affix my signature in presence of two witnesses.

CHARLES KLINGHAMMER.

Witnesses:
 OTTO KLINGHAMMER,
 ANNA KLINGHAMMER.